United States Patent Office 3,428,657
Patented Feb. 18, 1969

3,428,657
TETRAHYDROPYRANYLOXY DERIVATIVES OF STILBENE DERIVATIVES
John H. Fried, Palo Alto, Calif., assignor to Syntex Corporation, Panama, Panama, a corporation of Panama
No Drawing. Filed Dec. 7, 1965, Ser. No. 512,227
U.S. Cl. 260—345.8      5 Claims
Int. Cl. C07d 7/02; C09b 23/00; A61k 27/00

ABSTRACT OF THE DISCLOSURE

Tetrahydropyranyloxy derivatives of trans stilbenes useful as orally active estrogenic agents and to increase feed consumption in livestock are disclosed. These compounds have the formula

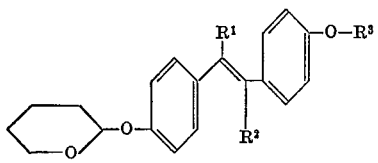

wherein each of $R^1$ and $R^2$ is hydrogen or lower alkyl and $R^3$ is hydrogen, tetrahydropyranyl, or a hydrocarbon carboxylic acyl group of less than 12 carbon atoms.

---

This invention relates to novel organic compounds. It particularly pertains to the tetrahydropyranyl ethers of trans stilbenes represented by the following structural formula:

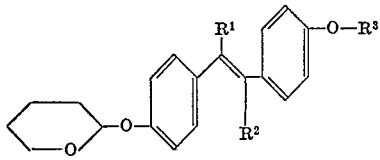

wherein each of $R^1$ and $R^2$ represents hydrogen or (lower) alkyl and $R^3$ represents hydrogen, tetrahydropyranyl, or a hydrocarbon carboxylic acyl group of less than 12 carbon atoms.

By the term (lower)alkyl in the foregoing definition is meant a monovalent radical derived from a saturated branched or straight chain hydrocarbon containing less than 5 carbon atoms, such as methyl, ethyl, n-propyl, isopropyl, butyl, and the like. By the term hydrocarbon carboxylic acyl group is intended an acyl group containing less than 12 carbon atoms thereby providing such ester groups as acetate, propionate, trimethylacetate, haloacetate, aminoacetate, benzoate, and the like.

The novel mono- or bisethers contemplated herein are provided by treatment of the trans stilbene derivatives such as stilbestrol, 3,4-bis(p-hydroxyphenyl)-3-hexene, and the like with dihydropyran in the presence of acid such as p-toluenesulfonic acid, dinitrobenzenesulfonic acid, p-toluenesulfonyl chloride and the like. The product may be readily separated from the inert organic solvent reaction solution by evaporation.

The novel products provided by this invention are orally active estrogenic agents and are thus useful in replacement therapy for cases of estrogen deficiency. These compounds may also be used to increase feed consumption in livestock with resultant fattening and improved appearance. They are also useful for fertility regulation for the control of rodents and other pests.

The following examples serve to illustrate but not limit the manner by which this invention may be practiced.

EXAMPLE 1

Two chemical equivalents of dihydropyran are added to a solution of 1 chemical equivalent of stilbestrol in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3,4-bis (p-tetrahydropyranyloxyphenyl)-3-hexene which may be further purified through recrystallization from the pentane.

By following the procedure of this example, 1,2-bis(p-tetrahydropyranyloxyphenyl)-ethylene, 2,3-bis(p-tetrahydropyranyloxyphenyl)-2-butene, and 4,5-bis(p-tetrahydropyranyloxyphenyl)-4-octene are prepared from the corresponding free dihydroxy compounds.

EXAMPLE 2

The procedure of Example 1 is followed except that 1 chemical equivalent of dihydropyran is used to yield 3-(p-tetrahydropyranyloxyphenyl) - 4 - (p-hydroxyphenyl)-3-hexene as the product.

The following compounds are subjected to the procedure of this example:

3-(p-hydroxyphenyl)-4-(p-acetoxyphenyl)-3-hexene;
1,2-bis(p-hydroxyphenyl)-ethylene;
2,3-bis(p-hydroxyphenyl)-2-butene;
3-(p-hydroxyphenyl)-4-(p-propionoxyphenyl)-3-hexene; and
4-(p-hydroxyphenyl)-5-(p-trimethylacetoxyphenyl)-4-octene.

There are respectively obtained:

3-(p-tetrahydropyranyloxyphenyl)-4-(p-acetoxyphenyl)-3-hexene;
1-(p-tetrahydropyranyloxyphenyl)-2-(p-hydroxyphenyl)-ethylene;
2-(p-tetrahydropyranyloxyphenyl)-3-(p-hydroxyphenyl)-2-butene;
3-(p-tetrahydropyranyloxyphenyl)-4-(p-propionoxyphenyl)-3-hexene; and
4-(p-tetrahydropyranyloxyphenyl)-5-(p-trimethylacetoxyphenyl)-4-octene.

What is claimed is:
1. A trans stilbene derivative having the formula:

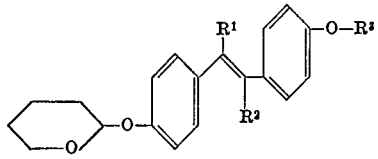

wherein each of $R^1$ and $R^2$ is hydrogen or (lower) alkyl and $R^3$ is hydrogen, tetrahydropyranyl, or a hydrocarbon carboxylic acyl group of less than 12 carbon atoms.

2. A compound of claim 1 wherein $R^3$ is hydrogen or a hydrocarbon carboxylic acyl group of less than 12 carbon atoms.

3. A compound of claim 1 wherein $R^3$ is tetrahydropyranyl.

4. A compound of claim 1 wherein
$R^1$ is ethyl,
$R^2$ is ethyl, and
$R^3$ is hydrogen.

5. A compound of claim 1 wherein
$R^1$ is ethyl,
$R^2$ is ethyl, and
$R^3$ is tetrahydropyranyl.

References Cited
UNITED STATES PATENTS 3,244,700  4/1966  Palopoli et al. _____ 260—240

HENRY R. JILES, *Primary Examiner.*

J. M. FORD, *Assistant Examiner.*

U.S. Cl. X.R.

260—345.9, 240; 424—283